US006925515B2

(12) United States Patent
Burns et al.

(10) Patent No.: US 6,925,515 B2
(45) Date of Patent: Aug. 2, 2005

(54) PRODUCER/CONSUMER LOCKING SYSTEM FOR EFFICIENT REPLICATION OF FILE DATA

(75) Inventors: Randal Chilton Burns, Sunnyvale, CA (US); Atul Goel, San Jose, CA (US); Wayne Curtis Hineman, San Jose, CA (US); Robert Michael Rees, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 09/849,307

(22) Filed: May 7, 2001

(65) Prior Publication Data

US 2003/0028695 A1 Feb. 6, 2003

(51) Int. Cl.[7] .............................................. G06F 12/00
(52) U.S. Cl. ...................................... 710/200; 707/201
(58) Field of Search ................................ 709/218, 230; 710/200; 711/118, 120, 121, 119; 707/10, 201, 200

(56) References Cited

U.S. PATENT DOCUMENTS

| | | | |
|---|---|---|---|
| 6,591,266 B1 * | 7/2003 | Li et al. ........................ | 707/10 |
| 2002/0078299 A1 * | 6/2002 | Chiou et al. ................ | 711/119 |

(Continued)

OTHER PUBLICATIONS

Norton, et al., Common Internet File System (CIFS), Version: CIFS–Spec 0.9, Storage Networking Industry Association, (pp. 1–17).*

(Continued)

*Primary Examiner*—Mark H. Rinehart
*Assistant Examiner*—Clifford Knoll

(74) *Attorney, Agent, or Firm*—Randy W. Lacasse; Lacasse & Associates, LLC; Ramraj Soundararajan

(57) ABSTRACT

In a distributed file system the distributed storage management is made useful to a variety of applications. Multiple quality of service options are provided through locking. Three locking systems are provided. The system offers a locking system designed for sequential consistency with write-back caching, typical of distributed file systems. A second locking system is provided for sequential consistency with no caching for applications that manage their own caches. Finally, a locking system that implements a weaker consistency model with write-back caching, designed for efficient replication and distribution of data is included. Locks for replication are suitable for serving dynamic data on the Internet and other highly-concurrent applications. The selection of the appropriate lock protocol for each file is set using the file metadata. Further, a novel locking system is provided for the lock system implementing a weak consistency model with write back caching. This system is implemented utilizing two whole file locks: a producer lock P and a consumer lock C. Any client can hold a consumer lock and when holding a consumer lock can read data and cache data for read. The producer lock is only held by a single writer and a writer holding a producer lock can write data, allocate and cache data for writing. When a writer performs a write, the write is performed as an out-of-place write. An out-of-place write writes the data to a different physical storage location than from which it was read. By performing an out-of-place write the old data still exists and is available to clients. Once the writer completes the write and releases the producer lock the previous data is invalidated and the clients are informed of the new location of the data. Clients can then read the new data from storage when needed and the server reclaims the old data blocks.

50 Claims, 3 Drawing Sheets

U.S. PATENT DOCUMENTS

| | | | |
|---|---|---|---|
| 2002/0091763 A1 * | 7/2002 | Shah et al. | 709/203 |
| 2002/0107944 A1 * | 8/2002 | Bai et al. | 709/220 |
| 2002/0120763 A1 * | 8/2002 | Miloushev et al. | 709/230 |
| 2003/0033283 A1 * | 2/2003 | Evans et al. | 707/1 |
| 2003/0120752 A1 * | 6/2003 | Corcoran | 709/219 |
| 2003/0120875 A1 * | 6/2003 | Bourne et al. | 711/144 |

OTHER PUBLICATIONS

"A Common Internet File System (CIFS/1.0) Protocol: Preliminary Draft", Network working group, Internet engineering task forc (draft–leach–cifs–v1–spec–00.txt), Mar. 13, 1997, pp. 1–18 (sic).*

* cited by examiner (a) Strong consistency (b) AFS weak consistency

PRODUCER/CONSUMER LOCKING SYSTEM FOR EFFICIENT REPLICATION OF FILE DATA

BACKGROUND OF THE INVENTION

1. Field of Invention

The present invention relates generally to the field of distributed file systems. More specifically, the present invention is related to a distributed file system supporting multiple locking protocols wherein one of the protocols is specifically suited for wide area data replication.

2. Discussion of Relevant Art

Distributed file systems have become the principal method for sharing data in distributed applications. Programmers understand local file system semantics well and use them to gain access to shared data easily. For exactly the same reason that distributed file systems are easy to use, they are difficult to implement. The distributed file system takes responsibility for providing synchronized access and consistent views of shared data, shielding the application and programmer from these tasks, by moving the complexity into the file system.

The file system responsibilities include data consistency and cache coherency. In a file system, the data consistency guarantee describes the interaction between distributed clients that concurrently read and write the same data. Most often, file systems implement sequential consistency—"a multi-processor is sequentially consistent if the result of any execution is the same as if the operations of all the processors were executed in some sequential order, and the operations of each individual processor occur in this sequence in the order specified by its program," see L. Lamport, "How to make a multiprocessor computer that correctly executes multiprocess programs," *IEEE Transactions on Computers*, C-28(9):241–248, 1979. Sequential consistency is the strongest consistency guarantee. However, some applications benefit from weakening the consistency guarantee in order to achieve better performance.

Cache coherency is the task of making sure that the data cached by a client does not violate the consistency guarantee and generally requires a locking protocol. For cache coherency protocols, the semantics of the locks used to implement the protocol define how data is managed in the system. However, in general, cache coherency locking is designed the other way around. Developers of a distributed data system choose the data model appropriate to their expected workload, and implement a set of locks that conform to that model.

For many distributed applications, the consistency guarantee and caching provided by the file system is more than adequate. These applications write to the file system interface and ignore all the complexity of managing distributed data.

Other distributed applications are not compatible with the file system consistency and coherency model, but would still like to take advantage of other file system services. A file system provides many things beyond consistency and caching, including: a name space, through which objects can be accessed; data management functions, such as backup and restore and hierarchical storage management; data reliability and availability; striping and RAID; distributed logical volume support, and mapping logical addresses to physical devices.

Locking systems supporting file system caching are appropriate for applications which do not perform their own caching, however, to optimize performance, availability and recovery, databases and other distributed applications manage their own data caches. Applications have knowledge of the structure of the data on which they operate and the semantics with which the data are changed. Consequently, applications can cache data at a finer granularity than a file system can, and therefore achieve more parallelism. They also can customize their distributed application's caching properties, e.g. implement a cooperative cache or a different consistency guarantee.

Implementing these applications on file systems that cache data results in data being cached twice. Also, file systems that cache written data prevent application caches from realizing as much parallelism as possible and reduce performance.

In order to illustrate the manner in which caching at the file system limits parallelism, assume an application that caches its own data at a fine granularity, a cache unit of 4 k bytes, constructed on a file system that caches data in larger segments. Now, if two clients concurrently write separate application cache units, they expect the writes to occur in parallel. However, because both writes lie with the same file system cache segment, concurrent writes are executed serially. That is, the first client to write to the file system obtains a write lock for that segment, and writes the data to the file system's cache. When the second client attempts to write, the write lock of the first client is revoked. The first client commits its changes to disk. The second client must then read the segment from disk before applying its write to the segment. Because the file system segment is larger than the application cache segment, writes often need to be serialized.

Many databases and parallel I/O applications use either a physical device or logical volume interface to avoid caching and obtain good parallel data performance. While device or volume access solves performance problems, consumers often prefer to build databases in file systems for manageability reasons. The advantages of a file system include name space, integrated backup, and extensibility. File systems give a hierarchically organized name to database objects, which is easier to understand than volume or device names. Data stored in file systems can be copied, moved, or backed up with file system tools, and databases offload this function to the file system. Finally, files make databases easy to extend and do not require an administrator for this task.

As described previously, some applications benefit from weakening the consistency guarantee. An area which can benefit from weakening the consistency guarantee is data replication. For reasons of manageability and ease of implementation, and despite the distributed file system's performance shortcomings, enterprise customers often choose to use file systems to replicate data among many web servers. Distributed file systems offer the web developer a well known interface that appears identical to a local file system. The interface shields the complexity of data distribution and consistency issues from the application. Web applications are written for a single server, and then deployed with no modifications on many computers. The deployment leverages the enterprise's existing distributed file system, and no new distributed systems need to be installed or administered.

The limitation of using a file system for wide area replication of web data is performance. Generally, file systems implement data locks that provide strong consistency between readers and writers. For replicating data from one writer to multiple readers, strong consistency produces lock contention—a flurry of network messages to obtain and revoke locks. Contention loads the network and results in slow application progress.

The posting of Olympics race results provides an example application to show how strong consistency locking works for replicating web servers. A possible configuration of the distributed system is illustrated in FIG. 1. Hundreds of web servers 104 have file system clients on the back end which read the web pages from a file system cache 102. Additionally, a database management system (DBMS) 106 reads and writes from a file system cache 102. The file system caches 102 communicate with a file system server 100. Race results and other dynamic data are inserted into the database 1 through an interface like SQL or ODBC. The insertion updates database tables, which sets off a database trigger 2. The trigger causes the databases to author a new web page and performs a write operation 3. The file system is responsible for distributing the new version of the web page to the remainder of the web servers 104 in a consistent fashion. The I/Os are performed out of file system caches, which the locking protocol keeps consistent. Web servers take HTTP requests, which result in data reads from the file system.

Poor performance occurs for a strong consistency locking protocol when updates occur to active files. For this example, we assume that the new file that is being updated is being read concurrently by multiple web servers before, during, and after new results are being posted and written. For race results during the Olympics, a good example would be a page that contains a summary of how many gold, silver and bronze medals have been won by each country. This page has wide interest and changes often. The system's initial configuration has the file system clients at all web servers holding a shared lock for the file in question. FIG. 2a displays the locking messages required to update a web page in a timing diagram.

The best possible performance of strong consistency locking occurs when the file system client at the database is not interrupted while it updates the web page. In this case, the writing client requests an exclusive lock on the file 200, which revokes all concurrently held read locks 202, 204. After revocation, the writer, in this case the DBMS, is granted an exclusive lock 206. When the writer completes, the client at each web server must request and be granted a shared lock on the data 208, 210, 212, 214 to reobtain the privilege to read and serve the web page. All messages to and from the web server occur for every web server. In the best case, four messages, REVOKE, RELEASE, ACQUIRE, and GRANT, go between each web server and the file system server. For large installations, multiple messages between web servers and the file server consume time and network bandwidth prohibitively.

When preemptible locks are implemented in the locking system, additional difficulties are incurred during an update by the DBMS, particularly when the DBMS is interrupted in the middle of updating the file. Data locks are preemptible, so clients that request read locks on the file, revoke the DBMS's exclusive lock. The more highly replicated the data is, the more web servers there are, and the more likely the DBMS will get interrupted. Requests for the lock can stall the update indefinitely. Furthermore, if the DBMS is interrupted in the middle of writing the new file, the update is incomplete, and the data that a reading client (Web Server) sees is not a parsable HTML document.

The example application presents a nonstandard workload to the file system. The workload lacks the properties a file system expects, and therefore operates inefficiently. For example, the workload does not have spatial locality to clients. Instead, all clients are interested in all files.

Performance concerns aside, strong consistency is the wrong model for updating web pages. Reading clients cannot understand intermediate updates and byte-level changes.

Outside the intermediate update problem, strong consistency is still not useful for serving the HTTP protocol. Since the web client/server protocol (HTTP) does not implement consistency between the browser cache and the server, a strong consistency guarantee at the server cannot be passed on to the ultimate consumers of the data at their browsers. Therefore, a weaker consistency model looks identical to web users and can be more efficiently implemented.

For existing distributed systems, the Andrew file system (AFS) is a system which provides weak consistency and comes close to implementing an efficient model for such data replication. AFS does not implement strong consistency, rather it chooses to synchronize file data between readers and writers when files opened for write are closed, see M. L. Kazar, "Synchronization and caching issues in the Andrew file system," *USENIX Winter Technical Conference*, February 1988. AFS cites statistics that argue that data are shared infrequently to justify this decision. The successor product to Andrew the Decorum file system, see Kazar et al., "Decorum file system architectural overview," *Proceedings of the Summer USENIX Conference*, June 1990, currently known as DFS, reversed this decision, because they found that distributed applications sometimes require sequential consistency for correctness. While strong consistency is now the de facto standard for file systems, AFS-style consistency remains useful for environments where concurrent action and low overhead dominate the need for correctness.

FIG. 2b shows the protocol used in AFS to handle the dynamic web updates in the example. At the start of the timing diagram, all web servers hold the web page (file) in question open for read. In AFS, an open instance 220 registers a client for callbacks—messages from the server invalidating their cached version. The DBMS opens the file for writing 220, receives the data from the server 222, writes the data to its cache, and closes the file. On close, the DBMS writes its cached copy of the file back to the server 224. The file system server notifies the web servers of the changes to the file by sending invalidation messages to all file system clients that have registered for a callback 226. The clients then open 228 and read 230 the updated data.

When compared to the protocol for strong consistency locking, AFS saves only one message between client and server. However, this belies the performance difference. In AFS, all protocol operations are asynchronous—file system clients never wait for lock revocations before proceeding. AFS eliminates lock contention and eliminates waiting for the locking protocol. The DBMS obtains a write instance from the server directly, and need not wait for a synchronous revocation call to all clients. Another significant advantage of AFS is that the old version of the web page is continuously available at the web servers while the file is being updated at the DBMS.

The disadvantage of AFS is that it does not correctly implement an efficient model for data replication. The actual behavior is that the AFS clients write dirty data back to the server when closing a file, and AFS servers send callback invalidation messages whenever clients write data. In most cases, these policies result in an appropriate consistency.

However, if a writing client writes back some portion of its cache without closing the file, a callback is sent to all registered clients, and reading clients can see partial updates. This most often occurs when a writing client, in our example of the DBMS, operates under a heavy load or on large files. In these cases, the cache manager writes back dirty blocks to the server to reclaim space.

With the above in mind it is apparent there exists a need for a distributed storage management system which is useful to a variety of applications. Furthermore, there is a need for a locking protocol which is designed for efficient data replication.

SUMMARY OF THE INVENTION

In a distributed file system, the distributed storage management is made useful to a variety of applications. Multiple quality of service options are provided through locking. Three locking systems are provided. The system offers a locking system designed for sequential consistency with write-back caching, typical of distributed file systems. A second locking system is provided for sequential consistency with no caching for applications that manage their own caches. Finally, a locking system that implements a weaker consistency model with write-back caching, designed for efficient replication and distribution of data is included. Locks for replication are suitable for serving dynamic data on the Internet and other highly-concurrent applications. The selection of the appropriate lock protocol for each file is set using the file metadata.

Further, a novel locking system is provided for the lock system implementing a weak consistency model with write back caching. This implementation is designed to be consistent with a model called the "publish consistency model." It is desirable, for example, for web servers to continue serving the old version of the file (web page) while a DBMS updates the page. Then, when the DBMS finishes its update, the new page can invalidate the old page atomically. This is called a publish consistency model. This model is implemented utilizing two whole file locks: a producer lock P and a consumer lock C. Any client can hold a consumer lock and when holding a consumer lock can read data and cache data for read. The producer lock is only held by a single writer and a writer holding a producer lock can write data, allocate and cache data for writing. When a writer performs a write, the write is performed as an out-of-place write. An out-of-place write writes the data to a different physical storage location than from which it was read. By performing an out-of-place write the old data still exists and is available to clients. Once the writer completes the write and releases the producer lock the previous data is invalidated and the clients are informed of the new location of the data. Clients can then read the new data from storage when needed and the server reclaims the old data blocks.

DESCRIPTION OF THE PREFERRED EMBODIMENTS

Figure 1:
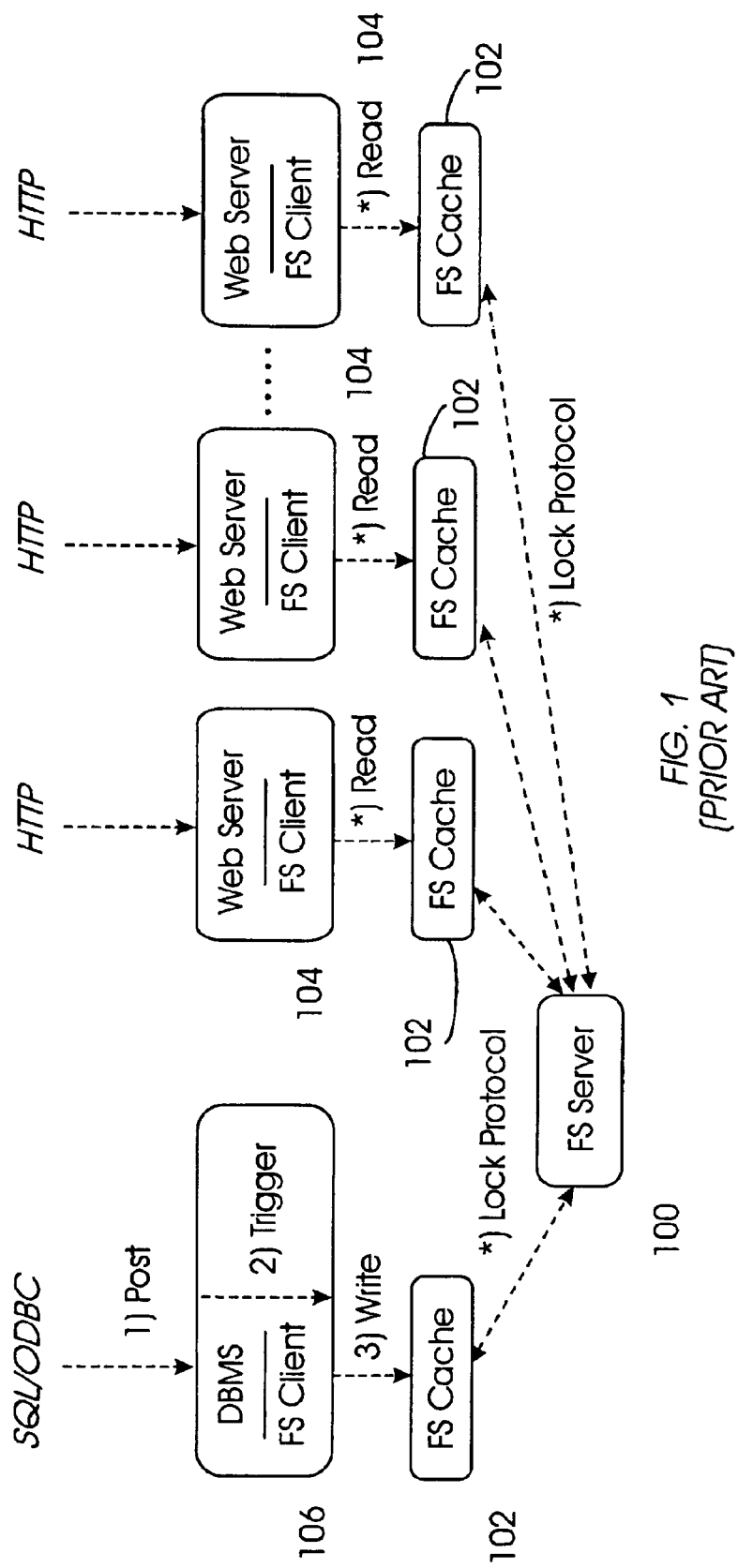
FIG. 1 illustrates an architecture using a file system to provide data replication for large scale web serving.
Figure 2A:
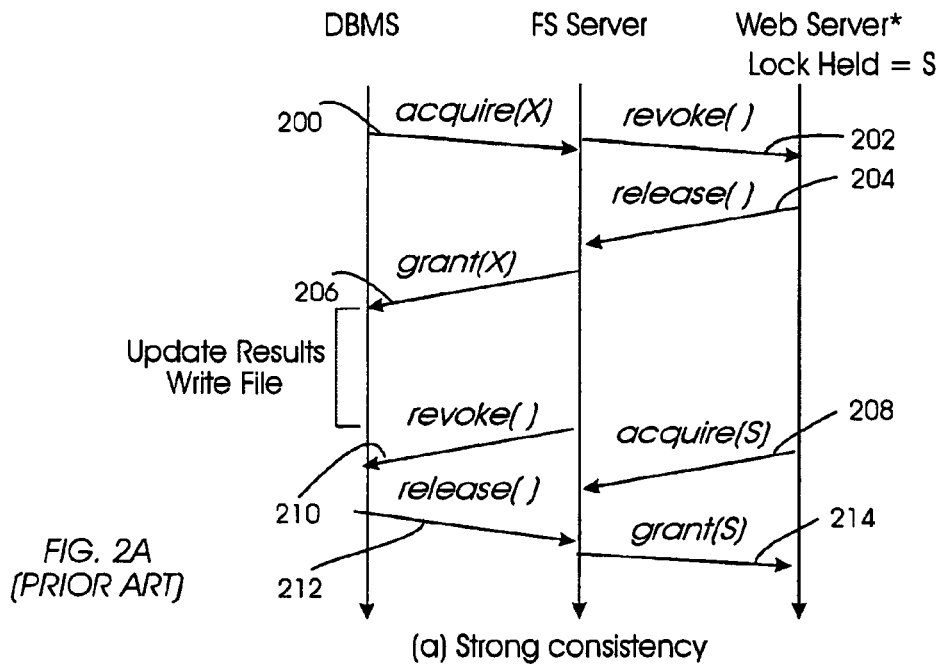
FIGS. 2a and 2b, respectively, illustrate locking protocols for distributing data to web servers through a file system using strong consistency and the Andrew file system's weak consistency.
Figure 2B:
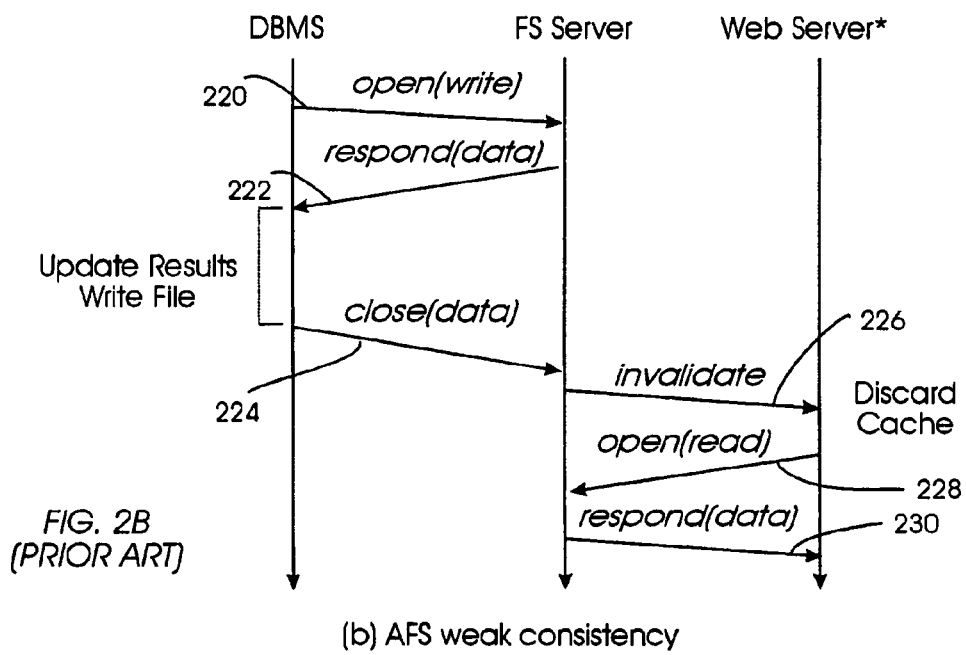

While this invention is illustrated and described in a preferred embodiment, the device may be produced in many different configurations and forms. There is depicted in the drawings, and will herein be described in detail, a preferred embodiment of the invention, with the understanding that the present disclosure is to be considered as a exemplification of the principles of the invention and the associated functional specifications of the architecture and semantics for its construction and is not intended to limit the invention to the embodiment illustrated. Those skilled in the art will envision many other possible variations within the scope of the present invention.

A brief digression into the preferred file system architecture in which we implement locking helps to explain the motivation for and advantages of multiple protocols and additionally provides a structure for implementing publish consistency.

Figure 3:
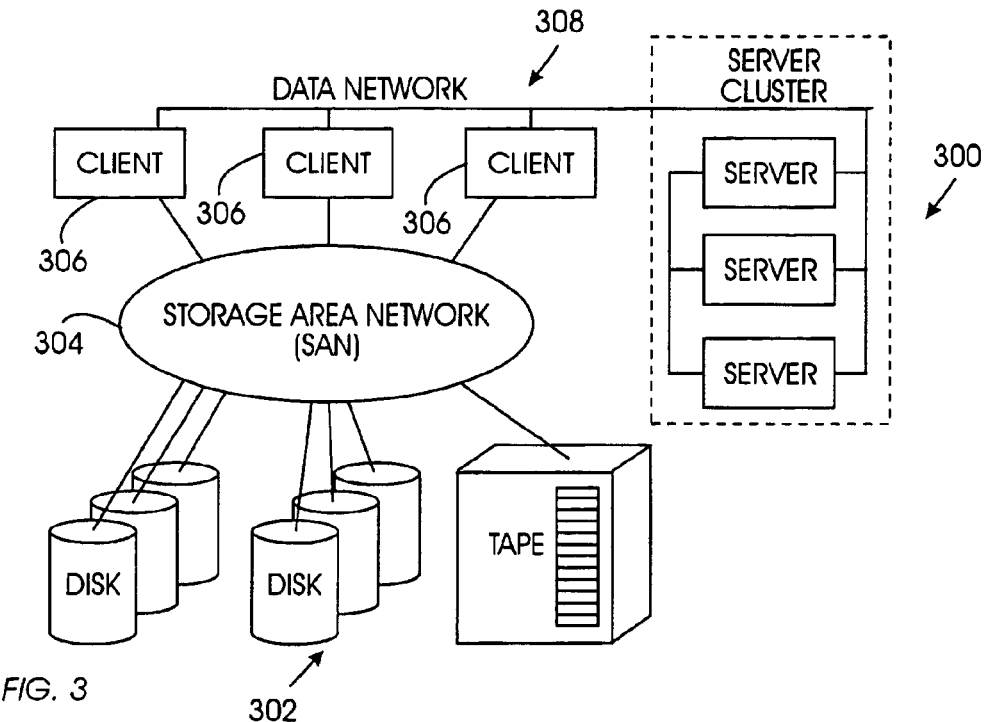
FIG. 3 illustrates a Client/Server distributed file system on a storage area network (SAN)

The distributed file system is built on a storage area network (SAN) as illustrated in FIG. 3. A SAN is a high speed network designed to allow multiple computers to have shared access to many disk drives. Currently, storage area networks are being constructed on Fibre Channel (FC) networks, see A. F. Brenner, "Fibre Channel: Gigabit Communication and I/O for Computer Networks," *Mcgraw-Hill Series on Computer Communications*, 1996, and IBM's Serial Storage Architecture. In the future, it is expected network-attached storage devices will be available for general purpose data networks, so that SANs can be constructed for high-speed networks such as Gigabit Ethernet, see H. Frazier et al., "Gigabit ethernet: From 100 to 1,000 Mbps," *IEEE Internet Computing*, 3(1), 1999. A distributed file system built on a SAN removes the server bottleneck for I/O request by giving clients a direct data path to the disks.

When building a distributed file system on a SAN, file systems clients 306 can access data directly over the storage area network 304. Most traditional client/server file systems store data on the server's private disks, see Walsh et al., "Overview of the Sun Network File System," *Proceedings of the* 1985 *Winter Usenix Technical Conference*, January 1985.; Morris et al., "Andrew: A Distributed Personal Computing Environment," *Communications of the ACM*, 29 (3): 184–201, March 1986; Kazar et al., "Decorum File System Architectural Overview," *Proceedings of the Summer USENIX Conference*, June 1990; M. Devarakonda, D. Kish, and A. Mohindra, "Recovery in the Calypso File System," *ACM Transactions on Computer Systems*, 14(3), August 1996. Clients function ship all data requests to a server that performs I/O on their behalf. Unlike traditional network file systems, the clients of the present system perform I/O directly to shared storage devices. This direct data access model is similar to the file system for Network Attached Secure Disks, see Gibson et al., "File systems for Network-Attach Secure Disks," Technical Report CMU-CS-97-118, School of Computer Science, Carnegie Mellon University, July 1997, using shared disks on an IP network, and the Global File system, see Walsh et al., "Overview of the Sun Network File System," *Proceedings of the* 1985 *Winter Usenix Technical Conference*, January 1985, for SAN-attached storage devices. Clients 306 access storage devices 302 directly over the SAN 304 to obtain data. Clients communicate with servers 300 over a separate general purpose network 308 to obtain file metadata. In addition to serving file system metadata, the servers 308 manage cache coherency protocols, authentication, and the allocation of file data (managing data placement and free space).

Unlike most file systems, the present system's metadata and data are stored separately. Metadata, including the location of the blocks of each file on shared storage, are kept on high-performance storage at the servers 300. The shared disks 302 contain only the blocks of data for the files and no metadata. In this way, the shared devices 302 on the SAN 304 can be optimized for data traffic (block transfer of data), and the server private storage can be optimized for metadata workload (frequent small reads and writes).

The SAN environment simplifies the distributed file system servers by removing their data tasks and radically changes the server's performance characteristics. Previously, server's performance for a distributed file system was measured by data rate (Megabytes/second). Performance was occasionally limited by network bandwidth, but more often limited by a server's ability to read data from storage and write it to the network. In the SAN environment, without any storage or network I/O, a server's performance is more properly measured in transactions per second, analogous to a database server. Without data to read and write, the file server performs many more transactions than a traditional file server with equal processing power. By using computational resources more efficiently, a higher data rate is presented to the file system client and allow a distributed file system to fully utilize its network infrastructure with less investment in server hardware.

This disclosure provides a description of only the semantics of sets of locks utilized in the present system. Lock management, i.e., the granting and revoking of locks in a distributed system, is not treated as it does not constitute a part of the present invention. Any currently known or future lock management scheme known in the art may be utilized in conjunction with the presently described lock semantics. In addition, details of locking data structures, the concepts of lock upgrade and downgrade, deadlock and data caching, all of which are familiar to one of skill the art, have not necessarily been provided in this disclosure. Refer to J. Gray and A. Reuter, *Transaction Processing*, Morgan Kaufmann Publishers, Inc., San Mateo, Calif., U.S.A., 1993. for a treatment of locking data structures and lock semantics and to D. E. Culler, J. P. Singh, and A. Gupta, *Parallel Computer Architecture: A Hardware/Software Approach*, Morgan Kaufmann Publishers, Inc., San Francisco, Calif., USA., 1999, for a discussion of caching and coherency protocols.

A set of locks designed for the traditional file system workload is provided in the present system. These locks implement sequential consistency and allow clients to cache data for both reading and writing. This consistency and caching model is identical to that used by major distributed file systems like DFS, see M. L. Kazar et al., "Decorum File System Architectural Overview," *Proceedings of the Summer USENIX Conference*, June 1990, and Calypso, see M. Devarakonda, D. Kish, and A. Mohindra. "Recovery in the Calypso File System," *ACM Transactions on Computer Systems*, 14(3), August 1996.

In the traditional file system workload, data are shared infrequently, which means that any given file should have strong affinity to the client that uses it. This would imply that clients should lock and unlock data for whole files at a time. While this statement holds true for the majority of files, when write sharing occurs, locking data at a finer granularity than the file level reduces lock contention. In the present system, as with other systems, hierarchical data locks are used to support sub-file or segment locking when write sharing occurs and allow whole files to be locked with a small amount of lock state when data are not shared for writing. This system is identical in concept to granular locking in database tables, see J. Gray and A. Reuter, *Transaction Processing: Concepts and Techniques*, Morgan Kaufmann Publishers, Inc., San Mateo, Calif., U.S.A., 1993.

Each file is divided into a collection of segments. Segments are logical and partition the address space of a file into pieces of fixed width. Segments are the locking granule. For each segment, defined are two preemptible cache locks. The shared segment lock $S_S$ allows lock holders to read data and cache data for read. The exclusive segment lock $S_X$ permits the lock holder to write data and cache data for write. Because segments are logical, not physical, segments that do not contain any data can be locked. For example, it is legal to lock a segment that is past the end of the file. That segment contains no data and has no physical storage allocated for it when it is locked. The exclusive segment lock can be held by only one client at a time, and no shared locks on the same segment may be concurrently held. A shared segment lock can be held by multiple clients at the same time. The compatibility table for these locks appears in Table 1, where the +'s indicate that the requested lock mode can be granted in conjunction with the currently held lock, and the −'s indicate that the request is in conflict with the current lock state.

| | Granted Mode | | |
|---|---|---|---|
| Requested Mode | None | $S_S$ | $S_X$ |
| $S_S$ | + | + | − |
| $S_X$ | + | − | − |

Certain attributes of a file cannot be captured by a single segment lock and require ownership of the whole file. For example, a process that truncates a file to zero length must hold a lock that grants exclusive access to every segment of the file. It is not adequate to perform whole file operations under multiple segment locks because operations, like truncation, must occur atomically. For this purpose, a set of locks that apply to the whole file are provided.

Whole file locks prevent the deadlock and starvation problems that arise when trying to lock every segment of a file individually. Provided are an exclusive lock $L_X$ and a shared lock $L_S$ on the whole file. In addition to whole file locks, provided are shared ($L_{IS}$) and exclusive ($L_{IX}$) intention locks. Also provided is a shared whole file lock combined with an intention to lock individual segment exclusively ($L_{SIX}$ whose privileges are merely the union of $L_S$ and $L_{IX}$. Intention locks are obtained by clients that "intend" to lock segments individually. A client that wishes to lock individual segments in a shared mode must first obtain a shared intention lock. Similarly, to lock segments in an exclusive mode, an exclusive intention lock must be held. The compatibility of these locks is described in Table 2, where the +'s indicate that the requested lock mode can be granted in conjunction with the currently held lock, and the −'s indicate that the request is in conflict with the current lock state.

| Requested Mode | Granted Mode | | | | | |
| --- | --- | --- | --- | --- | --- | --- |
| | None | $L_{IS}$ | $L_{IX}$ | $L_S$ | $L_{SIX}$ | $L_X$ |
| $L_{IS}$ | + | + | + | + | + | − |
| $L_{IX}$ | + | + | + | − | − | − |
| $L_S$ | + | + | − | + | − | − |
| $L_{SIX}$ | + | + | − | − | − | − |
| $L_X$ | + | − | − | − | − | − |

Holders of the exclusive lock $L_X$ can modify the length of the file, can read and write any segment, and can cache any segment for read or write. Holders of the shared lock are allowed to read any portion of the file, and are guaranteed that the length of the file does not change.

Segment and whole file locks have a hierarchical relationship that dictates their management. Only when a client holds an $L_{IX}$, $L_{IS}$, or $L_{SIX}$ file lock can it obtain a shared segment lock. Similarly, only in the context of an $L_{IX}$ or $L_{SIX}$ lock can an exclusive segment lock be obtained. So, as a side effect, whenever any intention lock is revoked, all of its subordinate segment locks must be relinquished.

The intent of this locking scheme is to operate efficiently for both regular file system workload, with little sharing, and the less frequent occurrence of concurrent write sharing. When clients are writing data that changes the length of the file, they hold whole file locks. For clients that read data, they generally hold locks for the segments that they are reading. The segment lock granule is the same as cache management unit, and segment locking captures locality in the cache. All of these locks allows clients to cache data for the actions the lock allows. Readers cache data at a segment of file granularity for read. Writers cache data for writing, i.e. operate a write-back cache. Aggressive client-side caching is a widely held tenet in distributed file system design for file system workload. The described set of data locks allow for client side caching with a sequential consistency guarantee on the data.

As previously described, databases and other applications which perform their own caching present problems to systems with locking systems implemented for file system caching. To alleviate the doubling caching and increase parallelism, a set of strong consistency locks without caching-no-caching locks, are offered. In this mode, we say that the file system "stays out of the way" of parallel applications and databases that manage caches within their applications, that is the file system does not perform caching operations. All I/O operations submitted to the file system are executed synchronously with stable storage.

To achieve strong consistency locks without caching, we use the same locking modes as we did for segment and whole files with caching, but the client actions under these locks differ. The term "same locks" is used because the locks have the same names, compatibility tables, and semantics. However, because there is no caching, the clients can take different actions under the same locks.

A comparison of the file operations allowed under locks between file system locking and no-caching locking is provided in table 3, where R represents a read, W represents a write, A represents allocation, $S_S$ represents allowing a shared segment lock, $S_X$ represents allowing an exclusive segment lock.

| Mode | File System Locking | Database and Parallel Application Locking |
| --- | --- | --- |
| $S_S$ | R | RW |
| $S_X$ | RW A | RW A |
| $L_{IS}$ | $S_S$ | $S_S$ |
| $L_{IX}$ | $S_X$ | $S_X$ |
| $L_S$ | R | RW |
| $L_{SIX}$ | $RS_X$ | RW $S_S S_X$ |
| $L_X$ | RW | RW A |

Allocation refers to a client changing the storage that backs a portion of file address space. In regular file system workload, allocation needs not be differentiated from write; the write privilege always implies an allocation privilege. However, for database and parallel applications, the write privilege is granted on a shared lock and must be differentiated from allocation. Write, in this case, means an in-place write, where data are written back to the same physical location from which they were, or could have been, read. This is to be differentiated from out-of-place write, where portions of a file are written to physical storage locations that differ from the locations from which they were read. To be precise, in our terms, allocation means placing physical storage behind logical file address space, and writing means writing data to an existing location. An out-of-place write should properly be considered an allocation followed by a write.

The changes in the lock semantics are systematic—all shared locks can now write data, but cannot allocate. Because there is no caching at the file system, all I/O operations go directly to a single non-volatile copy of the data, and multiple concurrent writers do not violate sequential consistency. The only guarantee multiple concurrent writers need is that the data does not change location, hence allocation requires an exclusive lock.

No-caching locks allow applications to manage caches directly. Databases and parallel applications using these locks realize the parallelism and efficiency expected when performing I/O to raw devices or logical volumes. These applications also receive the manageability advantages of a file system.

In addition to providing locks for file systems and non-caching locks, the present system provides a novel locking system which is particularly efficient for wide area data replication. This locking option for replication captures the performance efficiency of AFS, implements publish consistency exactly, and takes advantage of the SAN architecture. This is provided utilizing two whole file locks: a producer lock P and a consumer lock C. Any client can obtain a consumer lock at any time and a producer lock is held by a single writer as illustrated by the compatibility table in table 4.

| Requested Mode | Granted Mode | | |
| --- | --- | --- | --- |
| | None | C | P |
| C | + | + | + |
| P | + | + | − |

Clients holding a consumer lock can read data and cache data for read. Clients holding a producer lock can write data, allocate and cache data for writing, with all writes being performed out-of-place. Because clients hold P and C locks concurrently, the protocol must ensure that the P lock does not overwrite any of the old version of the file. Out-of-place writing permits the clients holding the P lock to proceed with writing, while the system retains the old version.

File publication occurs when the P lock holder releases the lock. Upon release, the server notifies all clients of the new location of the file. It is important to note that clients read data directly from the SAN—servers do not ship the clients data as with AFS. Having told all clients about the new version of the file, the server reclaims the blocks that belong to the old version of the file that are not in the new version.

Clients that receive a publication invalidate the old version of the file and, when interested, read the new version from the SAN. The client need not invalidate the whole new file. Instead, it only needs to invalidate the portions of the file that have changed. Because changed blocks have been written out-of-place, the client knows that any portions of the file for which the location of the physical storage has not changed have not been written, and this cached copy is valid. There is also the opportunity for the server to compress the size of its publication message to clients by sending only the changed blocks.

Figure 4:
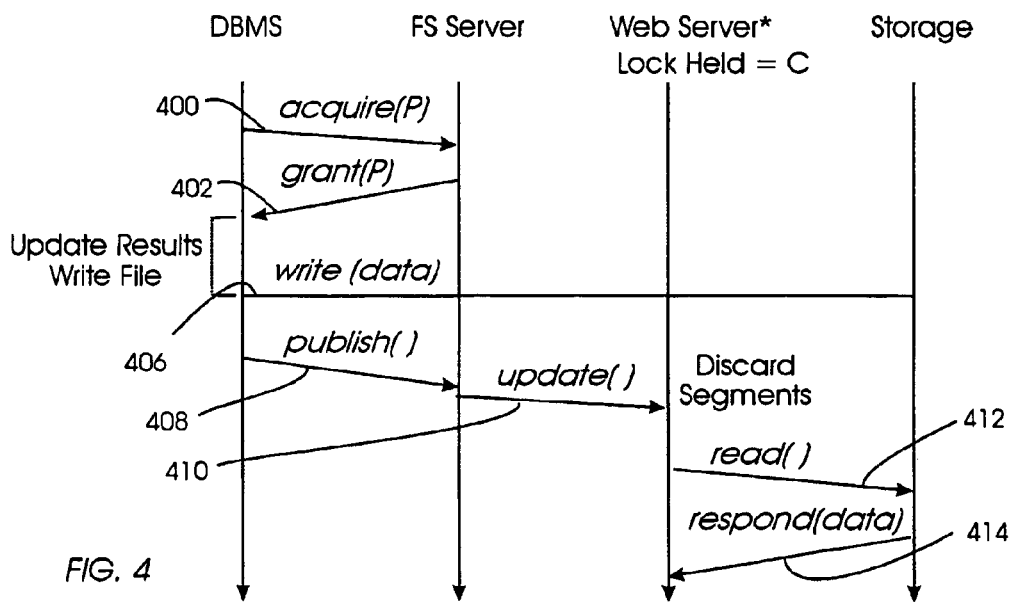
FIG. 4 illustrates a unique locking protocol of the present invention for distributing data to web servers.

Looking at our protocol using C and P locks, as illustrated in FIG. 4 it should be noted that the protocol uses fewer messages and all operations are asynchronous, like AFS. The DBMS requests 400 and obtains a producer (P) lock 402 from the server 100, which is granted immediately. While the DBMS holds the P lock, web servers 104 continue to read and serve the current version of the file. Then DBMS updates the file and writes it to storage using out-of-place writes 406. When the DBMS completes its updates, it closes the file and releases the P lock 408. The writer must release the P lock on close to publish the file. The server sends location updates to all clients that hold consumer locks 410. The clients immediately invalidate the affected blocks in their cache. At some later time, when clients generate interest in the changed data, they read the data from the SAN 412, 414.

The producer/consumer model has many of the same advantages of AFS and correctly implements publish consistency. Like AFS, all operations are asynchronous, read data is available while updates occur, and a client/server message is eliminated as compared to the strong consistency protocol. AFS overloads the DBMS writing data to the server as a cue to update the web server's data. With C and P locks, the web servers are not updated until the P lock holder releases the lock, generally on closing the file. This means that the P lock holder can write data to the SAN and even update the location metadata at the server without publishing the data. C and P locks dissociate updating readers' cache contents from writing data, and, therefore, correctly implement publish consistency.

Producer/consumer locking also leverages the SAN environment to improve performance. First, network operations are distributed across two networks, an IP network for protocol messages and a SAN for data traffic. This mitigates the network bottleneck that arises when servers ship data over the same network on which they conduct the locking protocol. The two networks also allow clients to update data in their cache asynchronously and at a fine granularity. Unlike AFS, the whole file need not be replaced at once. Instead, because C lock updates invalidate cached data at a fine granularity, changes to data are read on a block by block basis from storage. This reduces the total amount of data involved in publishing the new file version and spreads the acquisition of that data over more time.

In the system it is advantageous for the SAN storage to have a caching controller, i.e. storage devices cache data for read. The Web servers read data directly from storage, and they all read the same blocks. When caching data, the storage controller services reads at memory speed, rather than at disk speed. Without a cache, all reads would go to disk and any performance advantages of C and P locks would be lost in the slow I/O operations.

The use of multiple protocols produces a need for a mechanism for selecting the protocol for a given file. One advantageous method is selecting the locking protocol through file metadata. When clients open a file, they receive metadata for that file that dictates which of the three locking protocols apply. Alternatively, the locking protocol can be dictated by the file name, i.e., the location of the file in the name space. Another method to determine which locking protocol that applies is by assigning particular protocols to file extensions. Specific file extensions have an expected use, and therefore the appropriate lock protocol can be assign based upon use. Yet another method of designating which protocol to be used is to set the particular protocol for data based upon the system. For example, a web server is set up to use the publish consistency model, the database server is configured to use the no caching protocol, and the file system is configured to implement strong consistency.

When metadata selection is utilized, there are several possible techniques for assigning the locking protocol metadata when creating a file. In one technique administrators set up default locking protocols for portions of the file system name space, with strong consistency locking as the global default. Another technique is administrators configure locking protocols based on policy—examples of selection criteria include owner, group, and file extension. Policy overrides name space selection. Finally, client applications can change the locking protocol after file creation through a file system IOCTL call. Applications that require a quality of service can request it specifically by using a system specific function call. All of these techniques can be used singly or in conjunction with one another.

CONCLUSION

A system and method has been shown in the above embodiments for the effective implementation of a distributed file system particularly suited for a wide variety of applications which exhibit both traditional and non-traditional file system workloads in addition to a locking system particularly suited to highly-concurrent replication applications. While a preferred embodiment has been shown and described, it will be understood that there is no intent to limit the invention by such disclosure, but rather, it is intended to cover all modifications and alternate constructions falling within the spirit and scope of the invention, as defined in the appended claims. For example, the present invention provides for three locking systems which allow the system to be useful to almost all present applications, however, more than three locking systems may be included which are particularly suited for other applications which present different workloads on the file system. In addition, a shared file system, i.e., one that allows direct transfer of data between clients and storage devices, has been utilized to provide particular advantages. However, traditional distributed file systems, i.e. ones in which the servers fulfill clients request, can obtain the advantages provided by the locking system implementing publish consistency when utilized for wide area data replication.

What is claimed is:

1. A locking system implemented on a distributed file system where clients directly access data on storage devices via a storage area network and a file server provides metadata for said data and manages revocation and granting of locks of said lock system, said lock system comprising:
   a consumer lock, said consumer lock granted to one or more readers and said consumer lock allowing a reader granted said consumer lock to read a file comprising one or more blocks of data;
   a producer lock, said producer lock granted to a single writer and said producer lock allowing said writer granted said producer lock to update said file comprising one or more blocks of data, and
   wherein upon completion of said update, said writer releases said producer lock, and upon release of said producer lock, said updated file being published, with readers having a consumer lock associated with said updated file being notified regarding said update.

2. A locking system implemented on a distributed file system where clients directly access data on storage devices via a storage area network and a file server provides metadata for said data and manages revocation and granting of locks of said lock system as per claim 1, wherein said file is updated by writing changed blocks of data to a physical storage location different than where said block of data is stored.

3. A locking system implemented on a distributed file system where clients directly access data on storage devices via a storage area network and a file server provides metadata for said data and manages revocation and granting of locks of said lock system as per claim 2, wherein, after said publication of said file, said system notifies readers granted a consumer lock for said file retarding location of said updated file.

4. A locking system implemented on a distributed file system where clients directly access data on storage devices via a storage area network and a file server provides metadata for said data and manages revocation and granting of locks of said lock system as per claim 2, wherein copy of said file is held in a cache of said reader and changed blocks in said physical storage are updated in said cached copy, thereby providing updates at a finer granularity.

5. A locking system implemented on a distributed file system where clients directly access data on storage devices via a storage area network and a file server provides metadata for said data and manages revocation and granting of locks of said lock system as per claim 2, wherein reads performed on said block of data by said reader after receiving said notification are performed by reading said updated file at said notified location.

6. A locking system implemented on a distributed file system where clients directly access data on storage devices via a storage area network and a file server provides metadata for said data and manages revocation and granting of locks of said lock system as per claim 2, wherein said reader continues to read said file from the physical storage location while said writer is writing updated data to said different physical storage location.

7. A locking system implemented on a distributed file system where clients directly access data on storage devices via a storage area network and a file server provides metadata for said data and manages revocation and granting of locks of said lock system as per claim 1, wherein said writer writes data to storage devices physically separated from a storage device located on said file system server.

8. A locking system implemented on a distributed file system where clients directly access data on storage devices via a storage area network and a file server provides metadata for said data and manages revocation and granting of locks of said lock system as per claim 7, wherein said writer writes data to said physically separate storage devices that are part of a storage area network.

9. A locking system implemented on a distributed file system where clients directly access data on storage devices via a storage area network and a file server provides metadata for said data and manages revocation and granting of locks of said lock system as per claim 7, wherein said storage device located on said file system server stores metadata.

10. A locking system implemented on a distributed file system where clients directly access data on storage devices via a storage area network and a file server provides metadata for said data and manages revocation and granting of locks of said lock system as per claim 7, wherein said physically separate storage devices cache data for read operations.

11. A locking system implemented on a distributed file system where clients directly access data on storage devices via a storage area network and a file server provides metadata for said data and manages revocation and granting of locks of said lock system as per claim 1, wherein said reader is a web server.

12. A locking system implemented on a distributed file system where clients directly access data on storage devices via a storage area network and a file server provides metadata for said data and manages revocation and granting of locks of said lock system as per claim 1, wherein said writer is a database management system.

13. A locking system implemented on a distributed file system where clients directly access data on storage devices via a storage area network and a file server provides metadata for said data and manages revocation and granting of locks of said lock system as per claim 1, wherein said lock system is implemented on a system where said reader and said writer access data directly from storage devices via a storage area network and said readers and said writers access metadata from said file server via a data network separate from said storage area network.

14. A locking system implemented on a distributed file system where clients directly access data on storage devices via a storage area network and a file server provides metadata for said data and manages revocation and granting of locks of said lock system as per claim 1, wherein said lock system is implemented in a distributed file system which utilizes multiple locking systems for data where the locking system used for a particular block of data is dependent on what application utilizes said particular block of data and the locking system utilized for the particular block of data is indicated by the metadata corresponding to said particular block of data.

15. A method of updating a file comprising one or more data blocks in a distributed file system including a consumer lock, said consumer lock granted to multiple readers to allow said readers to read said file, and a producer lock, said producer lock granted to a single writer to allow said writer to update said file, said method comprising:
   receiving a request from a writer to grant an exclusive producer lock;
   granting said producer lock to said writer;
   receiving a producer lock release message, said producer lock release message being received after said writer completes updating said file; and
   publishing said updated file and sending an update message to said readers holding said consumer lock, said update message notifying said readers regarding said update.

16. A method of updating a file comprising one or more data blocks in a distributed file system including a consumer lock, said consumer lock granted to multiple readers to allow said readers to read said file, and a producer lock, said producer lock granted to a single writer to allow said writer to update said file as per claim 15, wherein said file is updated by writing changed blocks of data to a different physical storage location than where said data block is stored.

17. A method of updating a file comprising one or more data blocks in a distributed file system including a consumer lock, said consumer lock granted to multiple readers to allow said readers to read said file, and a producer lock, said producer lock granted to a writer to allow said writer to update said file as per claim 16, wherein said update message informs said readers granted a consumer lock for said file regarding location of said updated file.

18. A method of updating a file comprising one or more data blocks in a distributed file system including a consumer lock, said consumer lock granted to multiple readers to allow said readers to read said file, and a producer lock, said producer lock granted to a writer to allow said writer to update said file as per claim 16, wherein said update message causes a cached copy of said file held in a cache of said readers and changed blocks in said physical storage are updated in said cached copy, thereby providing updates at a finer granularity.

19. A method of updating a file comprising one or more data blocks in a distributed file system including a consumer lock, said consumer lock granted to multiple readers to allow said readers to read said file, and a producer lock, said producer lock granted to a writer to allow said writer to update said file as per claim 16, wherein reads performed on said data block by said readers after receiving said update message are performed by reading said updated file at said notified location.

20. A method of updating a file comprising one or more data blocks in a distributed file system including a consumer lock, said consumer lock granted to multiple readers to allow said readers to read said file, and a producer lock, said producer lock granted to a writer to allow said writer to update said file as per claim 16, wherein said reader continues to read said file from the physical storage location while said writer is writing said updated file to said different physical storage location.

21. A method of updating a file comprising one or more data blocks in a distributed file system including a consumer lock, said consumer lock granted to multiple readers to allow said readers to read said file, and a producer lock, said producer lock granted to a writer to allow said writer to update said file as per claim 15, wherein said writer writes data to storage devices physically separated from a storage device located on said file system server.

22. A method of updating a file comprising one or more data blocks in a distributed file system including a consumer lock, said consumer lock granted to multiple readers to allow said readers to read said file, and a producer lock, said producer lock granted to a writer to allow said writer to update said file as per claim 21, wherein said writer writes data to said physically separate storage devices that are part of a storage area network.

23. A method of updating a file comprising one or more data blocks in a distributed file system including a consumer lock, said consumer lock granted to multiple readers to allow said readers to read said file, and a producer lock, said producer lock granted to a writer to allow said writer to update said file as per claim 21, wherein said storage device located on said file system server stores metadata.

24. A method of updating a file comprising one or more data blocks in a distributed file system including a consumer lock, said consumer lock granted to multiple readers to allow said readers to read said file, and a producer lock, said producer lock granted to a writer to allow said writer to update said data block file as per claim 21, wherein said physically separate storage devices cache data for read operations.

25. A method of updating a file comprising one or more data blocks in a distributed file system including a consumer lock, said consumer lock granted to multiple readers to allow said readers to read said file, and a producer lock, said producer lock granted to a writer to allow said writer to update said data block file as per claim 15, wherein said reader is a web server.

26. A method of updating a file comprising one or more data blocks in a distributed file system including a consumer lock, said consumer lock granted to multiple readers to allow said readers to read said file, and a producer lock, said producer lock granted to a writer to allow said writer to update said file as per claim 15, wherein said writer is a database management system.

27. A method of updating a file comprising one or more data blocks in a distributed file system including a consumer lock, said consumer lock granted to multiple readers to allow said readers to read said file, and a producer lock, said producer lock granted to a writer to allow said writer to update said file as per claim 15, wherein said lock system is implemented on a system where said readers and said writer access data directly from storage devices via a storage area network and said readers and said writers access metadata from said file server via a data network separate from said storage area network.

28. A method of updating a file comprising one or more data blocks in a distributed file system including a consumer lock, said consumer lock granted to multiple readers to allow said readers to read said file, and a producer lock, said producer lock granted to a writer to allow said writer to update said file as per claim 15, wherein said method is implemented in a distributed file system which utilizes multiple locking systems for data where the locking system used for a particular block of data is dependent on what application utilizes said particular block of data and the locking system utilized for the particular block of data is indicated by the metadata corresponding to said particular block of data.

29. A method of updating a file comprising one or more data blocks in a distributed file system including a consumer lock, said consumer lock granted to multiple readers to allow said readers to read said file and a producer lock, said producer lock granted to a writer to allow said writer to update said file, said method comprising:

sending a request for said producer lock;

receiving said producer lock;

updating said file comprising one or more data blocks;

releasing said producer lock after said updating is completed;

publishing said updated file; and sending an update message to said readers granted said consumer lock after said releasing publishing step, said update message notifying said readers said file has been updated.

30. A method of updating a data block file comprising one or more data blocks in a distributed file system including a consumer lock, said consumer lock granted to multiple readers to allow said readers to read said file, and a producer lock, said producer lock granted to a writer to allow said writer to update said data block file as per claim 29, wherein said updating step comprises writing updated changed blocks of data to a different physical storage location than where said data block is stored.

31. A method of updating a file comprising one or more data blocks in a distributed file system including a consumer lock, said consumer lock granted to multiple readers to allow said readers to read said file, and a producer lock, said producer lock granted to a writer to allow said writer to update said data block file as per claim 29, wherein said notification update message informs said readers granted a consumer lock for said file regarding location of said updated file.

32. A method of updating a file comprising one or more data blocks in a distributed file system including a consumer lock, said consumer lock granted to multiple readers to allow said readers to read said file, and a producer lock, said producer lock granted to a writer to allow said writer to update said data block file as per claim 30, wherein said update message causes a cached copy of said data block held in a cache of said readers and changed blocks in said physical storage are updated in said cached copy, thereby providing updates at a finer granularity.

33. A method of updating a file comprising one or more data blocks in a distributed file system including a consumer lock, said consumer lock granted to multiple readers to allow said readers to read said file, and a producer lock, said producer lock granted to a writer to allow said writer to update said file as per claim 31, wherein reads performed on said data block by said readers after receiving said update message are performed by reading said updated file from said notified location.

34. A method of updating a file comprising one or more data blocks in a distributed file system including a consumer lock, said consumer lock granted to multiple readers to allow said readers to read said file, and a producer lock, said producer lock granted to a writer to allow said writer to update said file as per claim 30, wherein said readers continue to read said file from the physical storage location while said writer is writing updated data to said different physical storage location.

35. A method of updating a file comprising one or more data blocks in a distributed file system including a consumer lock, said consumer lock granted to multiple readers to allow said readers to read said file, and a producer lock, said producer lock granted to a writer to allow said writer to update said file as per claim 29, wherein said writer writes data to storage devices physically separated from a storage device located on said file system server.

36. A method of updating a file comprising one or more data blocks in a distributed file system including a consumer lock, said consumer lock granted to multiple readers to allow said readers to read said file, and a producer lock, said producer lock granted to a writer to allow said writer to update said file, as per claim 35, wherein said writer writes data to said physically separate storage devices that are part of a storage area network.

37. A method of updating a file comprising one or more data blocks in a distributed file system including a consumer lock, said consumer lock granted to multiple readers to allow said readers to read said file, and a producer lock, said producer lock granted to a writer to allow said writer to update said file as per claim 29, wherein said storage device located on said file system server stores metadata.

38. A method of updating a file comprising one or more data blocks in a distributed file system including a consumer lock, said consumer lock granted to multiple readers to allow said readers to read said file, and a producer lock, said producer lock granted to a writer to allow said writer to update said file as per claim 35, wherein said physically separate storage devices cache data for read operations.

39. A method of updating a file comprising one or more data blocks in a distributed file system including a consumer lock, said consumer lock granted to multiple readers to allow said readers to read said file, and a producer lock, said producer lock granted to a writer to allow said writer to update said file as per claim 29, wherein said reader is a web server.

40. A method of updating a file comprising one or more data blocks in a distributed file system including a consumer lock, said consumer lock granted to multiple readers to allow said readers to read said file, and a producer lock, said producer lock granted to a writer to allow said writer to update said file as per claim 29, wherein said writer is a database management system.

41. A method of updating a file comprising one or more data blocks in a distributed file system including a consumer lock, said consumer lock granted to multiple readers to allow said readers to read said file, and a producer lock, said producer lock granted to a writer to allow said writer to update said file as per claim 29, wherein said method is implemented on a system where said readers and said writer access data directly from storage devices via a storage area network and said readers and said writers access metadata from said file server via a data network separate from said storage area network.

42. A method of updating a file comprising one or more data blocks in a distributed file system including a consumer lock, said consumer lock granted to multiple readers to allow said readers to read said file, and a producer lock, said producer lock granted to a writer to allow said writer to update said file as per claim 29, wherein said method is implemented in a distributed file system which utilizes multiple locking systems for data where the locking system used for a particular block of data is dependent on what application utilizes said particular block of data and the locking system utilized for the particular block of data is indicated by the metadata corresponding to said particular block of data.

43. A distributed computing system including a file system handling cache coherency and data consistency providing quality of service through a locking protocol, said system comprising:

a server, said server connected to at least one client of said distributed computing system via a first data network, said server serving file metadata to said client upon said client accessing a file stored in said distributed computing system, said server managing data consistency and cache coherency through said locking protocol;

a storage device connected to said client via a second data network, said storage device storing file data;

wherein one of said locking protocol comprises the following locks:

a consumer lock, said consumer lock granted to one or more readers and said consumer lock allowing a reader granted said consumer lock to read a file comprising one or more blocks of data; and a producer lock, said producer lock granted to a single writer and said producer lock allowing said writer granted said producer lock to update said file comprising one or more blocks of data, and upon completion of said update said writer releases said producer lock, and upon release of said producer lock, said updated file being published, with readers having a consumer lock associated with said undated file being notified regarding said update.

44. A distributed computing system including a file system handling cache coherency and data consistency providing quality of service through a locking protocol, as per claim 43, wherein said file is changed by writing changed blocks of data to a physical storage location different than where said block of data is stored.

45. A distributed computing system including a file system handling cache coherency and data consistency providing quality of service through a locking protocol, as per claim 44, wherein, after said publication of said file, said system notifies readers granted a consumer lock for said file regarding location of said updated file.

46. A distributed computing system including a file system handling cache coherency and data consistency providing quality of service through a locking protocol, as per claim 45, wherein a cached copy of said file held in a cache of said reader and changed blocks in said physical storage are updated in said cached copy, thereby providing updates at a finer granularity.

47. A distributed computing system including a file system handling cache coherency and data consistency providing quality of service through a locking protocol, as per claim 45, wherein reads performed on said file are performed by reading updated data from said notified location.

48. A distributed computing system including a file system handling cache coherency and data consistency providing quality of service through a locking protocol, as per claim 44, wherein said reader continues to read said file from the physical storage location while said writer is writing updated file to said different physical storage location.

49. A distributed computing system including a file system handling cache coherency and data consistency providing quality of service through a locking protocol, as per claim 43, wherein said reader is a web server.

50. A distributed computing system including a file system handling cache coherency and data consistency providing quality of service through a locking protocol, as per claim 43, wherein said writer is a database management system.

* * * * *